$P = 2\,t/cm^2$
$(d_B = 0,6\,\mu)$ $P = 4\,t/cm^2$ $P = 6\,t/cm^2$ $P = 4 \, t/cm^2$
$(d_B = 0.9 \, \mu)$ $P = 6 \, t/cm^2$

United States Patent Office 3,404,201
Patented Oct. 1, 1968

3,404,201
METHOD OF MAKING SINTERED NUCLEAR FUEL PELLETS, IN PARTICULAR CONSISTING OF URANIUM DIOXIDE
Camille Braun, Itteville, and Roger Delmas and Bernard François, Grenoble, France, assignors to Commissariat à l'Energie Atomique, Paris, France, an organization of France
Filed Feb. 21, 1966, Ser. No. 529,143
Claims priority, application France, Feb. 22, 1965, 6,520
7 Claims. (Cl. 264—.5)

ABSTRACT OF THE DISCLOSURE

The fuel is made from a powder by preforming an element by subjecting this powder to pressure, and then sintering the element under an increasing temperature to obtain the sintered fuel having an intergranular microstructure. The parameters of powder fineness and rate of heating up during sintering are first chosen from fairly wide ranges. Then the preforming pressure for the element is determined, for the chosen powder fineness and rate of heating up, which will be necessary to ensure that the desired microstructure will be obtained on sintering, this preforming pressure being the important parameter.

---

The present invention relates to a method of making sintered nuclear fuel, pellets more especially of uranium dioxide (it being understood that the features of the present invention may possibly be applied to other fissionable ceramic materials, such as plutonium oxide or mixtures of uranium and plutonium oxides).

The chief object of this invention is to obtain nuclear fuel pellets which are more stable than those made up to this time, under the combined effects of nuclear radiations and of the temperature.

The invention is chiefly concerned with nuclear fuels of the kind in question in the form of sintered pellets having an intergranular microstructure, that is to say provided with big recesses or pores at the grain joints and of closed porosity (as opposed to the intragranular structure comprising pores in the grains), of a density which may range from 88 to 96% of the theoretical maximum density, practice having shown that such sintered materials are stable in the conditions under which nuclear reactors are made to work.

The invention consists, in order to obtain such pellets, in making use of methods including as it is known, a preliminary step of compressing a mass of the material in the form of a fine powder under the action of a suitable pressure to form what is conventionally referred to as a compact, this step being followed by a step of sintering under the action of the temperature applied according to a given schedule, that is to say with a certain rate of the temperature, and in proceeding in such manner, by a suitable choice of the compression pressure, of the fineness of the powder (preferably defind by the Blaine method, as referred to in ASTM designation C204–55) and of the rate of increase of the temperature sintered pellets are obtained which have the above mentioned intergranular microstructure that is to say which are provided with big recesses located at the grain joints, practically without communication with the outside (therefore of the closed porosity type).

Figure 1:
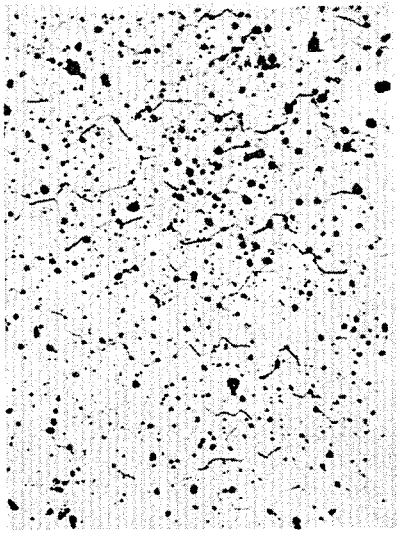
Figure 2:
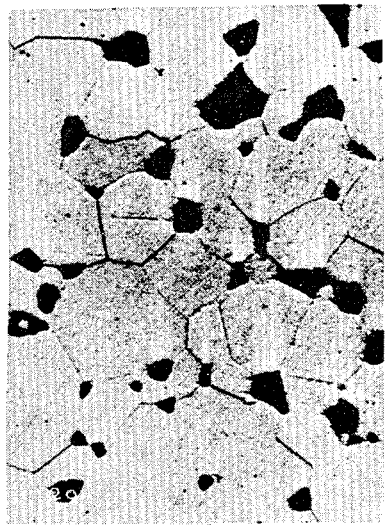
Figure 3:

Preferred embodiments of the present invention will be hereinafter described with reference to the appended drawings, and in which:

FIGS. 1, 2 and 3, respectively, show micrographies of a sintered uranium oxide obtained through three different treatments respectively, FIGS. 2 and 3 illustrating the invention for the obtainment of the intergranular microstructure.

Figure 4:
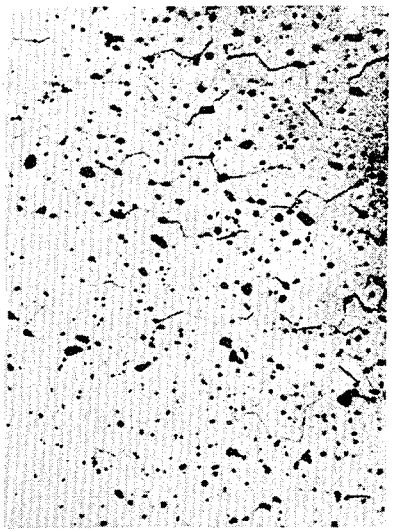
Figure 5:
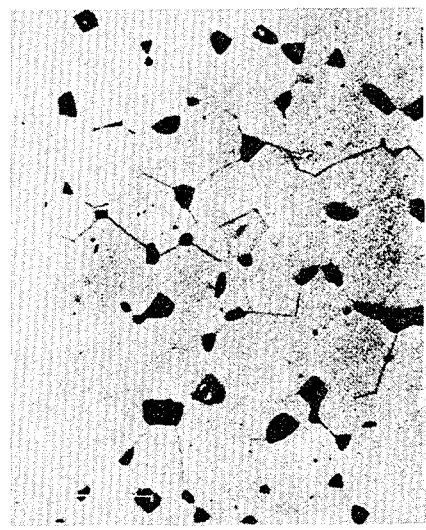

FIGS. 4 and 5 similarly show micrographies of a different uranium oxide, treated under other conditions, FIG. 5 illustrating the intergranular microstructure.

Uranium dioxide used as nuclear fuel is generally obtained by sintering of powder cylindrical compacts that have preliminarily been compressed, this sintering being performed in a reducing atmosphere and with a slow heating up rate ranging from 100 to 200° C. per hour.

This type of oxide generally has a density higher than 94% of the theoretical density of $UO_2$, and its microstructure is characterized by the presence of pores distributed mostly on the inside of the grains, themselves, this microstructure being of the kind of that illustrated by FIG. 1 and which may be called "intragranular" microstructure. There are also known oxides which comprise both this intragranular structure and some recesses between the grains.

Now, experience teaches that when it is endeavoured to use such fuel pellets up to very high burn-up rates, for instance higher than 20,000 MWJ/T, there is produced a microscopic swelling, explainable by the fact that fission gases are imprisoned inside a material which becomes a little plastic at relatively low temperatures.

It may be believed that a method for resisting this swelling would be to take a fuel pellet of relatively low density (from 88 to 92% of the theoretical density), in such manner as to provide in the material itself a volume available for the expansion of the fission gases. But, on the other hand, it is known that sintered $UO_2$ of the usual type tends to undergo an oversintering at high temperature, especially if the initial density is low. Furthermore, the temperature threshold beyond which this phenomenon may take place is considerably lowered by the effect of radiation, in particular in the case of fuel pellets having a very hot sheath, for which the total volume of $UO_2$ is brought to a temperature higher than this threshold. It follows that the fuel pellet may undergo a dimensional change or retraction, which involves an increase of the clearance between the fuel pellet and its sheath, and therefore, simultaneously, a detrimental increase of the thermal resistance of the interposed gas sheath, a collapse of the sheath with formation of pleats, and so on.

In order to obviate these drawbacks, use is made, according to the present invention, of a fuel pellet such that its microstructure essentially comprises pores distributed in the form of recesses at the grain joints and practically without communication with the outside, therefore of the closed porosity type. Experience taught that such pellets (the microstructure of which will be called "intergranular structure" as opposed to the above mentioned intragranular microstructure) have a high thermal stability and oppose swelling, such pellets having a density which may vary from 88 to 96% of the theoretical density, and preferably ranges from 90 to 94% of this theoretical density.

It has been found that such pellets are stable at temperatures averaging 180° C. and above, and undergo no modification, neither from the point of view of the distribution and size of the pores, nor from the point of view of densification, whereby these pellets constitute, for the application that is considered, new articles of manufacture.

Concerning their preparation, we have been led to make these fuel pellets by examining the manner in which the microstructure varies under the combined influences of the three following factors:

(a) The compressing pressure that is used to prepare the cylindrical compacts before sintering;

(b) The choice of the powder fineness, which may be expressed by the specific surface in m.²/g., or by the mean diameter of Blaine in microns, this last mentioned parameter being however used preferentially as giving a more accurate representation of the phenomenons, and (c) The choice of the rate of increase of the temperature.

Concerning factors (b) and (c), it was found that obtainment of the desired intergranular microstructure or shifting from the intragranular microstructure to the intergranular microstructure were improved by an increase of the powder fineness, that is to say an increase of the specific surface S and a decrease of the main diameter of Blaine, and by an increase of the rate V of the temperature increase.

It seems, according to experiments that have been made, that S and $d_B$ may be given values ranging within the following limits:

4 m.²/g. $<S<$ 15m.²/g. (a value which might however be exceeded)

$d_B \leq 0.9$ micron this being however only an indication.

As a matter of fact, factor (a), that is to say the compressing pressure, has proved to be very important, so that it permits of acting to a considerable degree upon the two other factors (b) and (c). In particular, it permits in some cases of obtaining the same intergranular oxide with big pores and a practically zero porosity from relatively coarse powders and with a slow sintering, that is to say in industrial practice conditions.

In a general manner, increase of the compressing pressure facilitates the formation of the intergranular microstructure.

This is what appears from the appended table wherein we have given six examples numbered from 1 to 6, using relatively high compressing pressures P and a relatively slow rate V of heating up, ranging from 100 to 200° C. per hour, the starting material being of moderate fineness, and a seventh example, numbered 7, using lower pressures but with a higher heating-up rate V and a finer starting material.

on the right, we have designated by A the usual intragranular microstructure and by B the intergranular microstructure according to the present invention, $B_1$ and $B_2$ designating two intergranular microstructures, the second one, $B_2$ being more perfect than the first one concerning the size of the pores and the conditions of closed porosity.

Taking as example the case of sample No. 1, with a powder having a mean Blaine diameter of 0.64 micron, when the compression pressure is increased from 2 tons/cm.² tons/cm.² (the tons being metric tons), that is to say when the density of the compact before sintering is increased (passing for instance from 5.5 to 6.2), we obtain the surprising result that, after sintering, it is the sample that has been more compressed which has the lower density (9.93 instead of 10.46 for the sample that was the less compressed initially). Microphotography indeed shows that we obtain intergranular microstructure B with big pores at the grain joints (explaining the decrease of density) and a closed porosity.

The same results will be obtained for the other samples, 2 to 5, treated with the same heating-up rate V, that is to say one of industrial value (generally rather low) ranging from 100 to 200° C. per hour.

It is found that is is advantageous to use a relatively fine powder, but the table shows that the factor chiefly to be relied upon is the Blaine mean diameter, the specific surface being not always a sufficient reference. For values $d_B$ ranging from 0.4 to 0.9 micron, which correspond to a fineness relatively easy to obtain industrially, favorable results may be obtained.

In a general manner, taking a powder of this kind and supposing that sintering can be performed with a given heating-up rate, it will be possible for someone skilled in the art relying upon micrographic tests, to choose a compressing pressure sufficiently high to provide the desired microstructure according to the invention.

FIGS. 1 to 3 illustrate the micrographic aspect of sample No. 2 in three respective cases of compressing, performed at 2 tons/cm.², 4 tons/cm.² and 6 tons/cm.². For a sintered pellet which has undergone compressing at 9 tons/cm.², we obtain (FIG. 1) an intragranular

| Sample | Specific surface S, m.²/g. | Blaine's diameter in micron, $d_B$ | Rate of heating up, V | Compressing pressure P, T/cm.² | Final density | Micrographic aspect |
|---|---|---|---|---|---|---|
| 1 | 7.5 | 0.64 | 100° to 200° C. per hour. | 2 | 10.46 95% | A |
| | | | | 6 | 9.93 90% | B |
| 2 (see Figs. 1 to 3) | 7.1 | 0.60 | do | 2 | 10.57 96% | A |
| | | | | 4 | 10.34 94% | $B_1$ |
| | | | | 6 | 10.03 86% | $B_2$ |
| 3 | 7.3 | 0.55 | do | 2 | 10.57 96% | A |
| | | | | 4 | 10.08 92% | $B_1$ |
| | | | | 6 | 9.43 86% | $B_2$ |
| 4 | 8.3 | 0.40 | do | 2 | 10.58 96% | A |
| | | | | 6 | 10 91% | B |
| 5 (see Figs. 4, 5) | 8 | 0.9 | do | 4 | 10.52 96% | A |
| | | | | 6 | 10.44 95% | B |
| 6 | 5 | 0.4 | do | 2 | 10.50 95% | A |
| | | | | 6 | 10.50 95% | B |
| | | | Fast up to 900° C. (1,000° C./h.) then 6,000° C./h. | 0.5 | 10.05 91% | A |
| | | | | 1 | 10.20 93% | A |
| | | | | 2 | 10.36 94% | $B_1$ |
| | | | | 3 | 10.21 93% | $B_2$ |

It will be noted that, in the last column, on the right hand side, we have indicated in every case the density (for instance 10.46 for sample 1) and the ratio with respect to the theoretical density of $UO_2$, which is 10.97 (for instance, for the same sample, 95%). In the last column microstructure, with pores distributed both between the grains and in the grains. For the same sintered pellet having undergone compressing at 4 tons/cm.², it is found (FIG. 2) that the intergranular microstructure ($B_1$) is already obtained, with the pores at the grain joints. Finally, when the compressing is performed at 6 tons/cm.$^2$, it is found that, after sintering (FIG. 3), the pores of FIG. 2 have further increased (B$_2$). Besides the table shows that the final density has dropped (91% of the theoretical density instead of 96% in the first case).

We have also shown in FIGS. 4 and 5, the case of sample No. 5, which is a limit case with a mean Blaine diameter of 0.9 micron. It will be seen that, with compressing at 4 tons/cm.$^2$ we obtain only an intragranular microstructure A (FIG. 4), but that intergranular microstructure B is obtained for compressing at 6 tons/cm.$^2$.

These high pressures are necessary for a powder of average fineness such as that of samples 1 to 6, but if finer powders are used, said pressure may be lowered as shown by the example of sample No. 7 for which it has been supposed that the powder is very fine ($d_B$ equal 0.3 micron); and that sintering is performed at a high rate V, for instance with a heating up of 1000° C. per hour up to 900° C., followed by a faster heating up, equal to 6000° C. per hour, up to the sintering temperature of 1600° C.

It will be seen that the intergranular microstructure appear for compressing pressures of the order of magnitude of 2 and 3 tons/cm.$^2$ (microstructure B$_1$ B$_2$), which give presintered products of a low density ranging from 4.3 to 4.8 whereas the final density is of the order of from 93 to 95% of the theoretical density.

In what precedes we have not described in detail the sintering operation proper, which takes place according to the known methods, by the effect of the temperature, generally in a reducing or neutral atmosphere or under vacuum.

We can thus obtain new nuclear fuel pellets, consisting in particular of uranium oxide, characterized by a given structure, of high and closed porosity, which ensures thermal stability and correct operation in nuclear reactors under the combined actions of the thermal interchanges and of the nuclear radiations.

In a general manner, while we have in the above description disclosed what we deem to be practical and efficient embodiments of the present invention, it should be well understood that we do not wish to be limited thereto as there might be changes made therein without departing from the principle of the invention as comprehended within the scope of the appended claims.

What we claim is:
1. In a method of making, from a powder of a nuclear fuel, a sintered nuclear fuel pellet having an intergranular microstructure comprising the steps of:
choosing the powder with a particular fineness, compressing a mass of said powder to form a compact, and sintering said compact under increasing temperature,
the improvement which comprises:
choosing the powder with a Blaine mean diameter at most equal to 0.9 micron,
choosing the rate of heating up at which the sintering is to be performed, said rate of heating up being in the range 100° C. to 6000° C. per hour,
compressing said mass of said powder to form said compact under a pressure sufficient, for the chosen powder fineness and the chosen heating up rate, to ensure that the desired intergranular microstructure will be obtained on sintering, said compressing pressure being in the range 2 to 6 ton/cm.$^2$,
and sintering said compact at the chosen rate of heating up to obtain the sintered nuclear fuel pellet having an intergranular microstructure.

2. A method according to claim 1 wherein the specific surface of the powder is less than 8 m.$^2$/g.

3. A method according to claim 1 wherein, for a Blaine mean diameter ranging from 0.4 micron to 0.9 micron and for a rate of heating up ranging from 100° C. to 200° C. per hour, the compressing pressure is at least equal to 4 tons/cm.$^2$.

4. A method according to claim 3 wherein the compressing pressure is above 6 tons/cm.$^2$.

5. A method according to claim 1 wherein, for a very fine powder having a Blaine mean diameter substantially equal to 0.3 micron and with a relatively high heating up rate averaging 1000° per hour up to the temperature of 900° C., followed by a heating up at the rate of 6000° C. per hour up to a sintering temperature of 1600° C., the compressing pressure ranges from 2 to 3 tons/cm.$^2$.

6. A method according to claim 3 wherein the compressing pressure is above 5 ton/cm.$^2$.

7. A method according to claim 1 wherein said nuclear fuel is uranium dioxide.

References Cited

UNITED STATES PATENTS 3,051,566    8/1962    Schwartz _____ 264—.5

OTHER REFERENCES

Proceedings of Second U.N. Conference . . . , 1958, vol. 6, pages 608, 609 and 614–619.

L. DEWAYNE RUTLEDGE, *Primary Examiner.*